2,912,418

METHOD OF PREPARING MOULDED ARTICLE FROM POLYMERISABLE MATERIALS

John Johnson, Nuffield, and Peter Maurice Jacques Koch de Gooreynd, Tillington, near Petworth, England, assignors, by direct and mesne assignments, to Peterlite Products Limited, London, England, a British company No Drawing. Application October 7, 1955
Serial No. 539,288

7 Claims. (Cl. 260—86.1)

This invention relates to the manufacture of moulded and shaped articles and to materials for the production of such articles. This application is a continuation-in-part of our United States application Serial No. 332,548, filed January 21, 1953, now abandoned.

Articles, such for example, as ophthalmic lenses and the transparent external parts of aircraft structures with which this invention is particularly concerned have been made of a thermoplastic material such as methyl methacrylate polymer.

The thermoplastic materials hitherto employed for these purposes have, however, proved unsuitable for use in the case of very fast flying aircraft for the reason that the friction of the passing air is liable to raise the temperature of the material to the softening point with the result that the transparency of the material may be diminished and the structure may become distorted.

Ophthalmic lenses have been made by moulding under heat and pressure between optically accurate dies a suitable transparent thermoplastic material which is conveniently polymethyl methacrylate. Such a thermoplast has a resilience and lightness that are very desirable for spectacle lenses but suffers from the disadvantage that it is easily scratched. To remove this disadvantage it has been suggested in United States Patent No. 2,640,227 to coat a polymethyl methacrylate core with a very thin layer of allyl methacrylate, which latter material gives a cross linked resin having a scratch resistance comparable with glass. Although large numbers of satisfactory lenses have been made by this method, it has been found that the sharp difference in properties of the two materials may lead to failure of some lenses in use.

An object of the present invention is to provide a method of making moulded and shaped articles which are able to withstand high temperatures without deterioration, and which have a shock resistance comparable with that of thermoplasts and a resistance to abrasion comparable with that of thermosetting materials.

Another object of this invention is to provide a material which can be moulded and shaped but can be converted to an infusible form.

Another object is to provide a mixture of polymerisable materials which is brought to a partially polymerised state in which a rigid mouldable sheet or block is formed, the sheet or block being capable of conversion to an infusible heat-resistant article.

A further object is to mould an infusible shaped article from a material having thermoplastic properties.

Without restricting the scope of this application it may be said that the invention includes the use of a mixture consisting of one or more polymerisable materials which when fully polymerised alone is or are a synthetic thermoplastic resin or resins and one or more polymerisable materials which when fully polymerised alone is or are a synthetic thermoset resin or resins. The mixture is polymerised directly to an intermediate stage in which a rigid, self-supporting, stable sheet or block is formed, the sheet or block being produced by direct polymerisation from a liquid or semi-liquid mixture and without special processes for separating polymer constituents from monomer constituents. The degree of polymerisation is such that the sheet or block, although it is rigid, exhibits thermoplastic characteristics and can be shaped and moulded under heat and pressure in a manner analogous to the shaping of sheets of polymethyl methacrylate. When fully cured, however, the shaped material is infusible and can withstand thermal conditions under which polymethyl methacrylate would deteriorate; by the suitable selection of the constituents of the mixture the cured articles have a high resistance to abrasion.

The constituents and proportions of the initial mixture and the condition of polymerisation are selected to give the desired stated properties in the intermediate sheet or block material, i.e. rigidity, mouldability and capacity to convert to an infusible form, and are best found by experiment. Having been found, it is possible to achieve reproducability of the intermediate copolymer by measuring some physical property such as power factor or refractive index of the ideal intermediate material, and subsequently to polymerise with continuous measurement of that property until the value corresponding to that found on the ideal sheet has been reached. This permits a more accurate method of control than repetition of a time temperature cycle.

The polymerisable materials which, when fully polymerised alone, form a thermoplastic synthetic resin can be selected from those containing a single $>C=C<$ linkage per molecule of the vinyl or allyl type. Examples are methyl and homologous alkyl methacrylates, styrene, vinyl acetate, methacrylic acid, allyl acetate, acrylonitrile and acrylamide. Similarly, the compounds which, when fully polymerised alone, form a thermoset synthetic resin, are selected from those containing two or more $>C=C<$ linkages per molecule of the vinyl or allyl type. Examples are allyl methacrylate, ethylene glycol dimethylacrylate and homologous glycol dimethacrylates, divinyl benzene, diallyl maleate and methacrylic anhydride.

The conditions of polymerisation of the mixture to the partially polymerised intermediate material are selected so that substantial cross-linking is prevented, the polymerisation being of the straight-chain type; this causes the intermediate material to be plastic. In the final polymerisation, cross-linking occurs to form an infusible product. The concentration and choice of the catalyst or mixture of catalysts employed to produce the intermediate and final product is governed by the nature of the constituents in the initial pelymerisable mixture, their concentrations and also the method of final polymerisation. If ultra violet light is to be used in the final polymerisation then a benzoin type of catalyst will be used. Where heat alone is to be used a peroxy or hydroperoxy type catalyst will be employed, and will be incorporated before and/or after the syrup is formed. For many materials within the scope of the invention benzoyl peroxide has been found to be a suitable catalyst.

As regards the relative proportions of the materials in the polymerisable mixture, these are best determined by experiment since they vary considerably with the nature of the constituents. It should be noted, however, that there is a limit to the total amount of thermosetting material or materials to be included in the mixture. Beyond certain limits, which are found by experiment, it becomes impossible to obtain the intermediate material in mouldable form due to the excessive amount of cross-linking in the early stages of polymerisation. As before stated, the conditions of polymerisation, as well as the other factors of the mixture, are selected to ensure that there is only a small amount of cross-linking in the intermediate mouldable product. In addition, the amount of the thermosetting constituents which can be introduced is influenced by the choice of thermoplastic constituent or constituents. Using methyl methacrylate and allyl methacrylate as the constituents of the initial mixture, the proportion of allyl methacrylate by weight in the mixture should not exceed 50% and preferably should lie within the range 10 to 50%. If the proportion of allyl methacrylate is increased substantially beyond 50%, the material formed by the polymerisation may tend to be too rigid to be moulded.

On the other hand, when the monomer mixture consists of allyl methacrylate and styrene, the proportion of allyl methacrylate can be as much as 80% by weight since the material formed after polymerisation is readily mouldable; the proportion of allyl methacrylate should lie within the range of 40% to 80% by weight.

When making ophthalmic lenses, it is preferred to employ equal proportions of allyl methacrylate and methyl methacrylate; for transparent domes for aircraft or the like a mixture consisting of 20% by weight of allyl methacrylate and 80% by weight of methyl methacrylate is preferred.

Usually, the intermediate and final products are homogeneous materials and are advantageously transparent. However, if desired, fibres, fillers or pigments may be included before solidification to the intermediate product to strengthen or otherwise modify the properties of the final product.

In the formation of the final shaped article the partially polymerised sheet or block material may for example be moulded in closed or flash moulds or it may be manually or mechanically shaped by hot pressing over a male or in a female die or by free blowing where the periphery of the pre-heated sheet is clamped and the shape formed by the application of compressed air on the underside of the sheet.

When producing ophthalmic lenses the partially polymerised material is worked into a preform closely approximating to the desired shape of the lens and the preform is then moulded under heat and pressure between optically accurate dies to complete the polymerisation and to mould the preform to have the desired optically accurate surfaces. When producing transparent domes for aircraft the partially polymerised material in sheet form is cut to the required contour for the finished article, heated to softening temperature and immediately formed under presure, the heat retained in the sheet during forming being sufficient substantially to complete the polymerisation of the material.

The invention will be more readily understood from the following examples of making mouldable materials and shaped articles therefrom.

*Example I*

A starting mixture was made consisting of 25% by weight of allyl methacrylate monomer and 75% by weight of methyl methacrylate monomer and to this mixture was added 0.1 to 0.5% by weight of benzoyl peroxide. The mixture was heated over a water bath at about 80° C. for about ½ hour until it had thickened to a light syrup. It was then poured into a casting mould consisting of parallel glass plates sealed at the edges by, for example, polyvinyl alcohol or cellulose acetate gaskets and spaced by cylinders of glass or other material inert to the syrup, such as polyethylene. The mixture was retained at 35° C. to 40° C. for 40 to 50 hours, after which time the mixture had become partially polymerised directly to a tough but mouldable sheet which was self supporting and could be cut or worked. The polymerisation of the material was largely of the straight-chain type and the sheet, after almost indefinite storage period, could be shaped by moulding under heat and pressure.

To mould the sheet, it was preheated to about 100° C. and introduced into a mould or shaping device and brought to a temperature of 150° C. and pressure applied. The temperature and pressure was retained for about 15 minutes after which time the polymerisation of the material was complete. Owing to cross-linking occuring during this final polymerisation, the shaped article was infusible and was accordingly highly resistant to temperature. The pressure to be used when making ophthalmic lenses is about 2 tons per square inch but when it is merely desired to bring the sheet to a desired curvature and shape without alteration of thickness, a pressure of the order of 15 lbs./sq. in. is sufficient.

In the foregoing example the allyl methacrylate component of the mixture may be varied within the range from about 10% to about 50% and the methyl methacrylate component of the mixture may be correspondingly varied within the range from about 90% to about 50% without any necessary variation of the amount of benzoyl peroxide or the conditions described and with the production of similar results.

*Example II*

In this example, the monomer mixture consisted of by weight 60% of allyl methacrylate and 40% of styrene, with the addition of 0.1 to 0.5% by weight of benzoyl peroxide. The mixture was heated at a temperature of 80° C. for 20 minutes to form the syrup and the partial polymerisation in the casting mould was effected at a temperature of 50° C. for 70 hours to form the mouldable sheet. Final moulding and curing was effected under pressure at a temperature of 150° C. Otherwise the process was the same as that in Example I.

In Example II, the allyl methacrylate component of the mixture may be varied within the range from about 40% to about 80% and the styrene component may be correspondingly varied within the range from about 60% to about 20% without any necessary variation of the amount of benzoyl peroxide or the polymerisation conditions described and with the production of similar results.

*Example III*

A mixture of equal parts diallyl maleate and methyl methacrylate was catalysed with 0.5% benzoyl peroxide. This monomeric mixture was converted to a viscous syrup by heating at 85° C. for twenty minutes. The prepared syrup was poured into a glass casting mould which had a polythene gasket and the filled mould placed in an oven at 60° C. After fifty hours, the mould was removed from the oven and a clear transparent sheet of cast material was removed from the glass mold. This material softened when heated at 100° C. Further heating at 150° C. coverted the copolymer to a hard brittle material which was substantially infusible.

*Example IV*

A monomeric mixture was prepared by adding two parts triallyl aconitate to three parts methyl methacrylate. The mixture was catalysed by adding 0.5% benzoyl peroxide and converted to a viscous syrup by heating for twenty-five minutes at 85° C. At the end of this period the syrup was poured between two glass sheets spaced by a polythene gasket. The mould was placed in an oven at 50° C. and left there for ninety six hours. At the end of this time, the cast sheet was removed from the glass mould and was found to be clear transparent and rigid. It was readily softened by heating to 100° C. but a prolonged period of heating at this temperature rendered the substance infusible. The same mouldable intermediate material was rendered substantially infusible in much shorter time by heating to 150° C.

Throughout this specification reference has been made to the use of heat and pressure for converting the partial polymerised material to the final thermoset product. In place of the application of external heat, the material may be subjected to the effect of high energy radiation, such as bombardment with γ particles, X-rays and like high velocity particles, as by exposing them to a cobalt 60 source. This radiation may serve to supply some of the energy required for polymerisation.

We claim:

1. A process for producing synthetic resin products comprising making a monomer mixture including 20 to 80% by weight of a monomer selected from the group consisting of methyl methacrylate, styrene, vinyl acetate, methacrylic acid, allyl acetate, acrylonitrile and acrylamide and 20 to 80% by weight of a monomer selected from the group consisting of allyl methacrylate, ethylene glycol dimethacrylate, divinyl benzene, diallyl maleate, triallyl aconitate and methacrylic anhydride, together with a polymerisation catalyst for said monomers, where the monomeric components of said mixture are methyl methacrylate and allyl methacrylate the content of allyl methacrylate being not substantially in excess of 50% by weight, partially polymerising said mixture to form a flowable syrup, placing said syrup in a casting mould, polymerising said syrup in said mould to produce a mouldable, rigid, workable partial polymer, removing said partial polymer from said mould, and subsequently shaping said partial polymer and curing it to infusible form.

2. A process for producing a mouldable sheet material comprising making a monomer mixture including 20 to 80% by weight of a monomer selected from the group consisting of methyl methacrylate, styrene, vinyl acetate, methacrylic acid, allyl acetate, acrylonitrile and acrylamide, and 20% to 80% by weight of a monomer selected from the group consisting of allyl methacrylate, ethylene glycol dimethacrylate, divinyl benzene, diallyl maleate, triallyl aconitate and methacrylic anhydride, togther with a polymerisation catalyst for said monomers, where the monomeric components of said mixture are methyl methacrylate and allyl methacrylate the content of allyl methacrylate being not substantially in excess of 50% by weight, partially polymerising said monomer mixture at a temperature exceeding 70° C. to form a flowable syrup, placing said syrup in a casting mould, and polymerising said syrup in said mould at a temperature of 30 to 80° C. for 40 to 100 hours to produce a mouldable, self-supporting, firm, workable partial polymer sheet.

3. A process for producing a mouldable sheet material comprising making a monomer mixture consisting of 50 to 80% by weight of methyl methacrylate monomer and 20 to 50% by weight of allyl methacrylate monomer together with a polymerisation catalyst for said monomers, heating said mixture at about 80° C. for ½ hour to form a flowable syrup, pouring said syrup into a sheet-making mould and polymerising said syrup in said mould at a temperature of 35 to 40° C. for 40 to 50 hours to produce a mouldable, self-supporting, firm, workable partial polymer sheet.

4. A process for producing synthetic resin products comprising making a monomer mixture including 20% to 80% by weight of a monomer selected from the group consisting of methyl methacrylate, styrene, vinyl acetate, methacrylic acid, allyl acetate, acrylonitrile and acrylamide and 20% to 80% by weight of a monomer selected from the group consisting of allyl methacrylate, ethylene glycol dimethacrylate, divinyl benzene, diallyl maleate, triallyl aconitate and methacrylic anhydride, together with a polymerisation catalyst for said monomers, where the monomeric components of said mixture are methyl methacrylate and allyl methacrylate the content of allyl methacrylate being not substantially in excess of 50% by weight, partially polymerising said monomer mixture at a temperature exceeding 70° C. to form a flowable syrup, placing said syrup in a casting mould, polymerising said syrup in said mould at a temperature of 30 to 80° C. for 40 to 100 hours to produce a mouldable, self-supporting partial polymer, removing said partial polymer from said mould and subsequently shaping said partial polymer under heat and pressure and curing the shaped partial polymer to infusible form.

5. A process for producing a shaped product comprising making a mixture consisting of 50 to 80% by weight of methyl methacrylate monomer and 20 to 50% by weight of allyl methacrylate monomer, together with a polymerisation catalyst for said monomers, heating said mixture at about 80° C. for ½ hour, to form a flowable syrup, pouring said syrup into a casting mould, polymerising said syrup in said mould at a temperature of 35 to 40° C. for 40 to 50 hours to produce a mouldable, self-supporting workable partial polymer, removing said partial polymer from said mould, shaping said partial polymer under pressure and curing said partial polymer to infusible form at a temperature of about 150° C. for about 15 minutes.

6. A process for producing synthetic resin products comprising making a monomer mixture including 20 to 80% by weight of a monomer selected from the group consisting of methyl methacrylate, styrene, vinyl acetate, methacrylic acid, allyl acetate, acrylonitrile and acrylamide and 20 to 80% by weight of a monomer selected from the group consisting of allyl methacrylate, ethylene glycol dimethacrylate, divinyl benzene, diallyl maleate, triallyl aconitate and methacrylic anhydride, together with a polymerisation catalyst for said monomers, where the monomeric components of said mixture are methyl methacrylate and allyl methacrylate the content of allyl methacrylate being not substantially in excess of 50% by weight, partially polymerising said mixture to form a flowable syrup, placing said syrup in a casting mold, and polymerising said syrup in said mold to produce a mouldable, rigid, workable partial polymer which is mouldable under heat and pressure and is further polymerisable by heat alone to the infusible thermoset form.

7. A method of manufacturing a mouldable article which comprises heating a mixture consisting essentially of methyl methacrylate and allyl methacrylate in proportions ranging between 50% and 90% and between 50% to 10% respectively, together with 0.1 to 0.5% of benzoyl peroxide at a temperature of about 60° C. for about an hour to form a flowable syrup, and pouring the syrup into a casting mould in which it is retained at a temperature of about 50° C. until the syrup has been partially polymerised to a mouldable rigid, self-supporting, storable article.

References Cited in the file of this patent

UNITED STATES PATENTS

| | | |
|---|---|---|
| 2,361,055 | Pollack | Oct. 24, 1944 |
| 2,643,247 | Fisher | June 23, 1953 |
| 2,723,968 | Williams | Nov. 15, 1955 |
| 2,729,625 | Hurwitz | Jan. 3, 1956 |